(12) United States Patent
Jin et al.

(10) Patent No.: US 9,412,516 B2
(45) Date of Patent: Aug. 9, 2016

(54) RESOLVER AND METHOD OF MANUFACTURING THE SAME

(71) Applicant: Hanwha Techwin Co., Ltd., Changwon-si (KR)

(72) Inventors: Chang-sung Jin, Changwon (KR); Yong-ho Park, Changwon (KR); Jin-ju Lee, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 316 days.

(21) Appl. No.: 13/897,494

(22) Filed: May 20, 2013

(65) Prior Publication Data

US 2014/0125324 A1    May 8, 2014

(30) Foreign Application Priority Data

Nov. 2, 2012  (KR) .......................... 10-2012-0123742

(51) Int. Cl.
| | |
|---|---|
| *G01B 7/14* | (2006.01) |
| *G01B 7/30* | (2006.01) |
| *H01F 5/00* | (2006.01) |
| *H01F 41/06* | (2016.01) |
| *G01D 5/22* | (2006.01) |
| *H02K 24/00* | (2006.01) |

(Continued)

(52) U.S. Cl.
CPC .............. *H01F 41/06* (2013.01); *G01D 5/2046* (2013.01); *G01D 5/2066* (2013.01); *G01D 5/2086* (2013.01); *G01D 5/2291* (2013.01); *H02K 24/00* (2013.01); *G01D 3/036* (2013.01); *G01D 5/2013* (2013.01)

(58) Field of Classification Search
CPC ........ H01F 41/06; G01B 7/30; G01D 5/2046; G01D 5/2291; G01D 5/2066; G01D 5/2086; G01D 3/036; G01D 5/2013; H02K 24/00
USPC ........... 324/51, 55, 178, 200, 207.11, 207.13, 324/341, 207.18
See application file for complete search history.

(56) References Cited

U.S. PATENT DOCUMENTS 3,990,062 A * 11/1976 Miller et al. .............. 340/870.19
5,949,359 A *  9/1999 Vlahu ........................... 341/116
7,183,952 B1    2/2007 Akutsu et al.

(Continued)

FOREIGN PATENT DOCUMENTS

| JP | 2011-002388 A | 1/2011 |
|---|---|---|
| KR | 10-2011-0127778 A | 1/2001 |

(Continued)

*Primary Examiner* — Huy Q Phan
*Assistant Examiner* — Raul Rios Russo
(74) *Attorney, Agent, or Firm* — Sughrue Mion, PLLC

(57) ABSTRACT

Provided is a method of manufacturing a resolver having a stator mounted around a rotator and configured to detect a rotational angle of a motor, the method including: forming the stator to have a core with protrusions disposed at a predetermined interval along a rotational direction of the rotator; winding a signal source coil around the protrusions of the core to generate an alternate current (AC) magnetic field when an input voltage signal is applied thereto; and winding a plurality of output signal coils alternately along the rotational direction of the rotator around the protrusions of the core, along the rotational direction of the rotator, to generate induced voltage signals of different phases in response to the AC magnetic field generated by the signal source coil and the rotation of the rotator.

7 Claims, 11 Drawing Sheets

(51) Int. Cl.
*G01D 5/20* (2006.01)
*G01D 3/036* (2006.01)

(56) References Cited

U.S. PATENT DOCUMENTS

| | | | |
|---|---|---|---|
| 2006/0125345 A1* | 6/2006 | Lee | 310/269 |
| 2009/0179529 A1* | 7/2009 | Makino | B62D 5/0403 310/68 B |
| 2009/0179632 A1* | 7/2009 | Nishiguchi | H02K 24/00 324/207.25 |
| 2010/0057648 A1* | 3/2010 | Dai | G06F 17/243 706/12 |
| 2010/0321007 A1 | 12/2010 | Fukuda et al. | |
| 2011/0109304 A1* | 5/2011 | Suzuki | H02K 24/00 324/207.25 |
| 2011/0285386 A1* | 11/2011 | Kikuchi et al. | 324/207.17 |
| 2012/0139380 A1* | 6/2012 | Taniguchi | H02K 1/2746 310/156.48 |
| 2012/0274185 A1* | 11/2012 | Kanemitsu | H02K 29/08 310/68 B |
| 2012/0274316 A1* | 11/2012 | Matsuura et al. | 324/207.17 |
| 2013/0264987 A1* | 10/2013 | Uchida | H02K 7/145 318/495 |

FOREIGN PATENT DOCUMENTS

| | | |
|---|---|---|
| KR | 10-2007-0039385 A | 4/2007 |
| WO | 2011/145778 A1 | 11/2011 |

* cited by examiner $\theta = 0°$

RESOLVER AND METHOD OF MANUFACTURING THE SAME

CROSS-REFERENCE TO RELATED PATENT APPLICATION

This application claims priority from Korean Patent Application No. 10-2012-0123742, filed on Nov. 2, 2012 in the Korean Intellectual Property Office, the disclosure of which is incorporated herein in its entirety by reference.

BACKGROUND

1. Field

Apparatuses and methods consistent with exemplary embodiments relate to a resolver and a method of manufacturing the same, and more particularly, to a resolver including a rotator and a stator that allows detection of a rotational angle of a motor, and a method of manufacturing the resolver.

2. Description of the Related Art

A resolver, such as a variable reluctance resolver, includes a rotator and a stator that allow detection of a rotational angle of a motor.

The rotator of the resolver is linked to a rotator axis of the motor and thus rotates together with a rotator of the motor.

The stator mounted around the rotator of the resolver includes a core, a signal source coil, and a plurality of output signal coils.

Protrusions are formed on the core with a constant interval therebetween along a rotational direction of the rotator.

The signal source coil is wound around the protrusions of the core to generate an alternate current (AC) magnetic field when an input voltage signal is applied thereto.

The plurality of output signal coils are wound around the protrusions of the core together with the signal source coil to generate induced voltage signals of different phases in response to the AC magnetic field generated by the signal source coil and the rotation of the rotator. Variable positive and negative polarity voltages alternate in the induced voltage signals.

By using the induced voltage signals of different phases with the plurality of output signal coils instead of a single output signal coil, a rotational angle of the motor may be immediately obtained.

In such resolver of the related art, the plurality of output signal coils are wound around each protrusion of the core of the stator. Accordingly, to obtain the induced voltage signals of different phases, the plurality of output signal coils should be wound around each of the protrusions by a different number of turns. Thus, the total numbers of turns for the protrusions of the core may be different from each other.

The resolver of the related art has the following problems.

First, an error in the number of turns of the output signal coils occurs frequently when the resolver of the related art is manufactured.

Second, since the core of the stator must be designed according to a protrusion having the greatest number of turns, an efficient stator structure cannot be obtained.

SUMMARY

One or more exemplary embodiments provide a resolver of which manufacturing errors are reduced and design optimization is easy, and a method of manufacturing the same.

According to an aspect of an exemplary embodiment, there is provided a method of manufacturing a resolver having a stator mounted around a rotator, the method including: forming the stator to have a core with protrusions disposed at a predetermined interval along a rotational direction of the rotator; winding a signal source coil around the protrusions of the core to generate an alternate current (AC) magnetic field when an input voltage signal is applied thereto; and winding a plurality of output signal coils alternately along the rotational direction of the rotator around the protrusions of the core, along the rotational direction of the rotator, to generate induced voltage signals of different phases in response to the AC magnetic field generated by the signal source coil and the rotation of the rotator.

The rotator of the resolver may be configured to rotate with respect to a rotator axis of the motor.

The method may further include providing the rotator having repetitive curvatures on the circumferential surface of the rotator in a rotational direction of the rotator.

The rotator may include a plurality of protruded polarities oriented towards the protrusions of the core along the repetitive curvatures on the circumferential surface.

The method may further include determining a number of the protrusions of the core which may be proportional to a value obtained by multiplying the number of the output signal coils by the number of protruded polarities of the rotator.

Each of the plurality of output signal coils is wound by the same number of turns around each of the protrusions, respectively.

The method may further include determining the same number of turns of the each of the plurality of output signal coils by the equation Nip=2 Nt/Z, where Nip denotes the same number of turns of the each of the plurality of output signal coils, Nt denotes a total number of turns of the output signal coil and Z denotes a number of protrusions of the core.

According to an aspect of another exemplary embodiment, there is provided a resolver configured to detect a rotational angle of a motor including: a rotator; a stator mounted around the rotator and comprising a core having protrusions disposed at a predetermined interval along a rotational direction of the rotator; a signal source coil wound around the protrusions of the core and configured to generate an alternate current (AC) magnetic field when an input voltage signal is applied thereto; and a plurality of output signal coils wound around protrusions of the protrusions of the core in an alternating manner along the rotational direction of the rotator.

The plurality of output signal coils may include the same number of turns around the protrusions The rotator of the resolver may be configured to rotate with respect to a rotator axis of the motor and rotate with a rotator of the motor.

The rotator of the resolver may include repetitive curvatures on the circumferential surface in a rotational direction of the rotator.

The rotator may also include a plurality of protruded polarities that are oriented towards the protrusions of the core along the repetitive curvatures.

The plurality of output signal coils may include a first output signal coil wound around odd-numbered protrusions along the rotational direction of the rotator and a second output signal coil wound around even-numbered protrusions along the rotational direction of the rotator The first output signal coil may be configured to generate a first induced voltage signal in response to the AC magnetic field generated by the signal source coil and a rotation of the rotator. The second output signal coil may be configured to generate a second induced voltage signal in response to the AC magnetic field generated by the signal source coil and the rotation of the rotator. The first output signal coil and the second output signal coil may provide a phase difference of 90° between the first induced voltage signal and the second induced voltage signal.

The signal source coil may be wound around each of the protrusions of the core by the same number of turns. The total number of turns around each of the protrusions of the core is the same.

A number of protrusions of the core may be proportional to a value obtained by multiplying a number of the output signal coils by a number of protruded polarities of the rotator.

According to an aspect of another exemplary embodiment, there is provided a resolver including: a rotator having a plurality of polarities; and a stator mounted around the rotator and including: a first plurality of protrusions wound with a first signal source coil and a first output signal coil; and a second plurality of protrusions wound with a second signal source coil and a second output signal coil, wherein the first plurality of protrusion and the second plurality of protrusions are disposed in an alternating manner from each other along a rotational direction of the rotator.

The first output signal coil is wound around the plurality of by the same number of output coil turns, and wherein the second output signal coil may be wound the same number of output coil turns.

The first and second signal source coil may be wound by the same number of source coil turns, and wherein each of the first and second plurality of protrusions may include the same total number of turns including the same number of output coil turns and the same number of source coil turns.

BRIEF DESCRIPTION OF THE DRAWINGS

The above and/or other aspects will become more apparent by describing in detail exemplary embodiments thereof with reference to the attached drawings in which.

DETAILED DESCRIPTION

Figure 1:
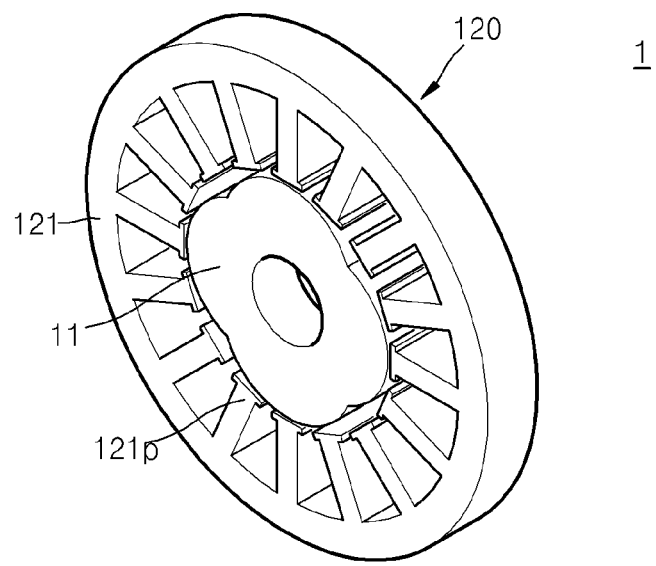
FIG. 1 is a perspective view illustrating a resolver according to an exemplary embodiment.

Hereinafter, one or more embodiments will be described in detail with reference to accompanying drawings. Also, in drawings, same reference numerals denote same elements to avoid repetition, and parts readily implemented by one of ordinary skill in the art may be omitted.

In addition, the specification and drawings are not provided for the purpose of limitation of the exemplary embodiments, and the scope of the inventive concept should be defined by the scope of claims. The terms used in the specification should be analyzed as the meaning and concept meeting the technical spirit of the inventive concept to most properly express the exemplary embodiments.

Figure 2:
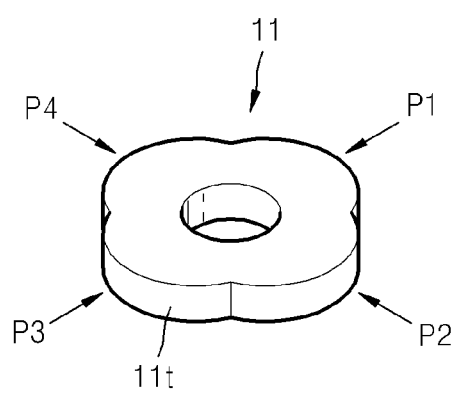
FIG. 2 is a perspective view illustrating a rotator of the resolver of FIG. 1 according to an exemplary embodiment.
Figure 3A:
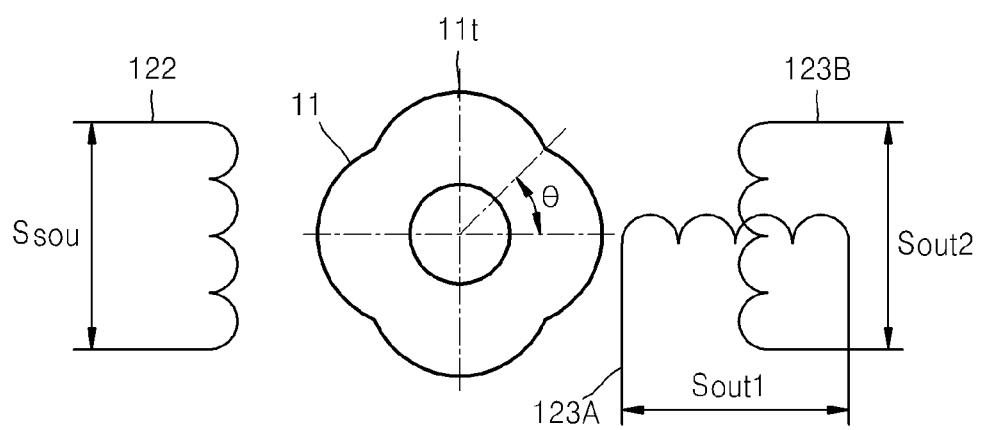
FIG. 3A illustrates a configuration and an operation of the resolver of FIG. 1 according to an exemplary embodiment.
Figure 3B:
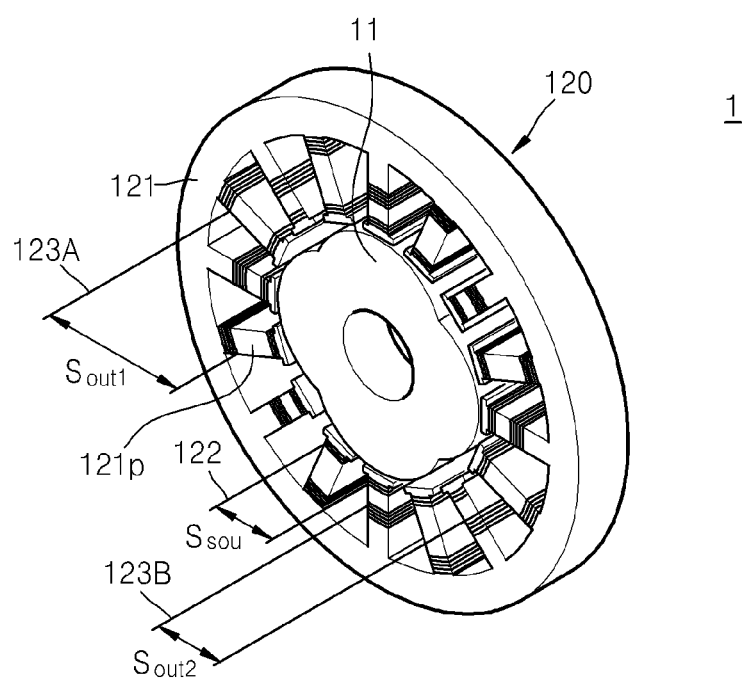
FIG. 3B illustrates a configuration of the resolver of FIG. 1 including a signal source coil and output signal coils wound on protrusions according to an exemplary embodiment.

FIG. 1 is a perspective view illustrating a resolver 1, according to an exemplary embodiment. FIG. 2 is a perspective view illustrating a rotator 11 of the resolver 1 of FIG. 1 according to an exemplary embodiment. FIG. 3A illustrates a configuration and an operation of the resolver 1 of FIG. 1 according to an exemplary embodiment and FIG. 3B illustrates a configuration of the resolver of FIG. 1 including a signal source coil 122 and output signal coils 123A and 123B wound on protrusions 121p according to an exemplary embodiment.

The resolver 1 according to an exemplary embodiment will now be described with reference to FIGS. 1, 2, 3A and 3B.

The resolver 1 includes the rotator 11 and a stator 120 and allows detection of a rotational angle of a motor (not shown).

The stator 120 mounted around the rotator 11 includes a core 121, a signal source coil 122, and a plurality of output signal coils 123A and 123B. In the current exemplary embodiment, the plurality of output signal coils 123A and 123B include a first output signal coil 123A and a second output signal coil 123B.

Protrusions 121p are formed on the core 121 with a constant interval therebetween along a rotational direction of the rotator 11.

The signal source coil 122 is wound around the protrusions 121p of the core 121 to generate an alternate current (AC) magnetic field when an input voltage signal $S_{sou}$ is applied thereto.

The first and second output signal coils 123A and 123B are sequentially and alternately wound around different protrusions 121p of the core 121 to generate induced voltage signals of different phases in response to the AC magnetic field generated by the signal source coil 122 and the rotation of the rotator 11.

Figure 6:
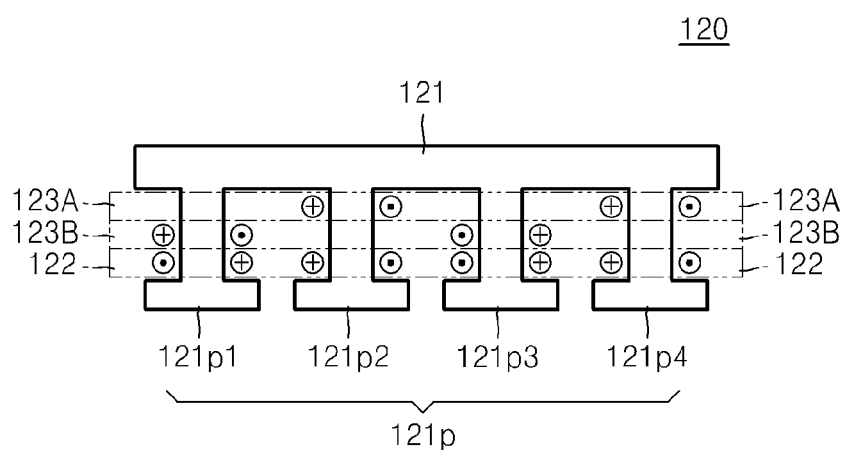
FIG. 6 is a cross-sectional view for describing a method of winding coils around a core of a stator in a method of manufacturing the resolver of FIG. 1 according to an exemplary embodiment.

In the current exemplary embodiment, the first output signal coil 123A is wound around even-numbered protrusions of the protrusions 121p2 and 121p4 of the core 121 (See FIG. 6).

The second output signal coil 123B is wound around odd-numbered protrusions of the protrusions 121p1 and 121p3 of the core 121 (See FIG. 6).

The first output signal coil 123A generates a first induced voltage signal $S_{out1}$ in response to the AC magnetic field generated by the signal source coil 122 and the rotation of the rotator 11. The second output signal coil 123B generates a second induced voltage signal $S_{out2}$ in response to the AC magnetic field generated by the signal source coil 122 and the rotation of the rotator 11.

Since the first output signal coil 123A and the second output signal coil 123B are alternately wound around the protrusions 121p of the core 121 at the alternating positions, a phase difference of 90° occurs between the first induced voltage signal $S_{out1}$ and the second induced voltage signal $S_{out2}$ due to reluctance of the circumferential surface of the rotator 11 in the rotation direction of the rotator 11.

The rotator 11 is linked to a rotator axis (not shown) of the motor and rotates together with a rotator (not shown) of the motor.

Repetitive curvatures 11t are formed on the circumferential surface of the rotator 11 in the rotation direction of the rotator 11. In addition, the rotator 11 has a plurality of protruded polarities P1, P2, P3 and P4 oriented towards the protrusions 121p of the core 121 as shown in FIG. 2.

The number Z of protrusions 121p of the core 121 is proportional to a value obtained by multiplying the number m of output signal coils 123A and 123B by the number X of protruded polarities P1, P2, P3 and P4 of the rotator 11. Usually, the number Z of protrusions 121p of the core 121 is referred to as the number of teeth of the stator 120. The number Z of protrusions 121p of the core 121 may be given by Equation (1).

$$Z = 2kmX \qquad \text{Equation (1)}$$

In the current exemplary embodiment, k is equal to 1, m is equal to 2, and X is equal to 4. Thus, the number Z of protrusions 121p of the core 121 is equal to 16.

The number Nip of turns of any one of the plurality of output signal coils 123A and 123B around any one protrusion 121p of the core 121 may be given by Equation (2) when a total number of turns of the output signal coil 123A or 123B is Nt.

$$\text{Nip} = \frac{Nt}{(Z/2)} \qquad \text{Equation (2)}$$

In Equation (2), the denominator in the right side is Z/2 instead of Z because the first and second output signal coils 123A and 123B are sequentially and alternately wound around the different protrusions 121p of the core 121.

In brief, the signal source coil 122 is wound around each of the protrusions 121p of the core 121 by the same number of turns. The first output signal coil 123A is wound around each of the even-numbered protrusions 121p2 and 121p4 of the core 121 by the same number of turns (See FIG. 6). The second output signal coil 123B is wound around each of the odd-numbered protrusions 121p1 and 121p3 of the core 121 by the same number of turns (See FIG. 6). Thus, the total number of turns around each of the protrusions 121p of the core 121 is the same.

That is, even though the first and second output signal coils 123A and 123B are sequentially and alternately wound around the different protrusions 121p of the core 121 by the same number of turns, the first and second induced voltage signal $S_{out1}$ and $S_{out2}$ of different phases may be obtained due to the reluctance of the circumferential surface of the rotator 11 in the rotation direction of the rotator 11. Accordingly, the total number of turns around each of the protrusions 121p of the core 121 may be the same.

Therefore, the resolver 1 according to an exemplary embodiment may have the following effects.

First, occurrence of an error in the number of turns of the first and second output signal coils 123A and 123B when the resolver 1 is manufactured can be prevented.

Second, since the core 121 of the stator 120 can be designed under the condition that the total number of turns around each protrusion 121p is the same, an efficient stator structure can be designed.

Figure 4:
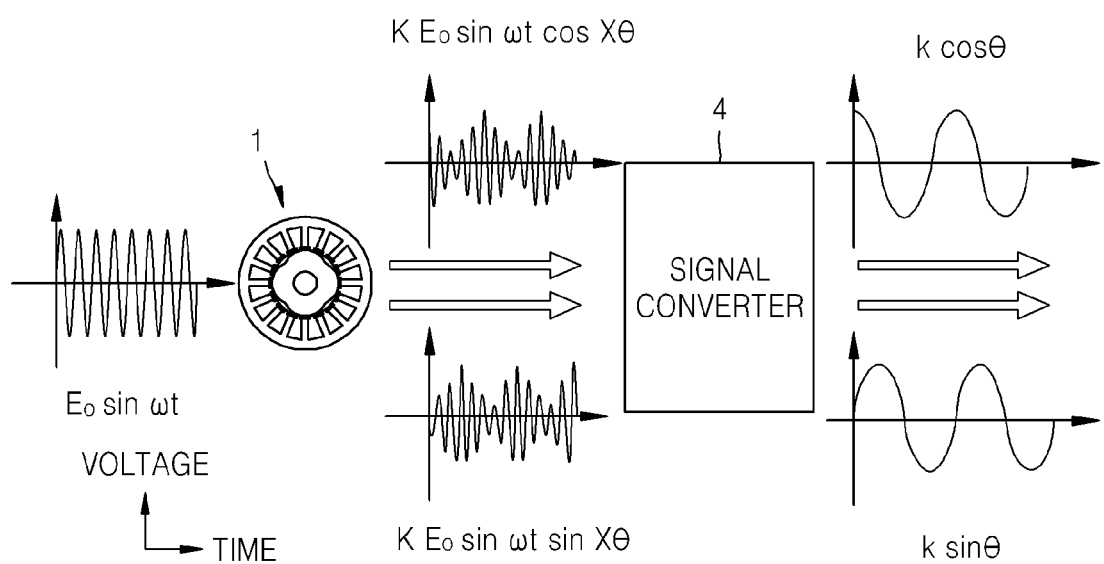
FIG. 4 illustrates output signals of the resolver of FIG. 1 according to an exemplary embodiment.

FIG. 4 illustrates that the first and second output signals $S_{out1}$ and $S_{out2}$ of the resolver 1 of FIG. 1 according to an exemplary embodiment.

Referring to FIGS. 1 through 4, the input voltage signal $S_{sou}$, which is input to the signal source coil 122 to generate an AC magnetic field, is obtained by Equation (3).

$$S\text{sou} = E_0 \sin \omega t \qquad \text{Equation (3)}$$

In Equation (3), $E_0$ denotes a peak voltage value, ω denotes an angular velocity, and t denotes time.

The first induced voltage signal $S_{out1}$ that is an output signal of the first output signal coil 123A is obtained by Equation (4).

$$S\text{out}1 = KE_0 \sin \omega t \cos X\theta \qquad \text{Equation (4)}$$

In Equation (4), K denotes a constant proportional to the peak voltage value $E_0$ and is determined according to a leakage magnetic flux and a linkage magnetic flux at the resolver 1. In addition, X denotes the number of protruded polarities P1, P2, P3 and P4, and θ denotes a rotational angle of the rotator 11.

The second induced voltage signal $S_{out2}$ that is an output signal of the second output signal coil 123B is obtained by Equation (5).

$$S\text{out}2 = KE_0 \sin \omega t \sin X\theta \qquad \text{Equation (5)}$$

A signal converter 4 obtains digital sinusoidal signals corresponding to the first and second induced voltage signals $S_{out1}$ and $S_{out2}$ input from the resolver 1 and provides the digital sinusoidal signals to a controller (not shown) of the motor.

Assuming that a constant according to a characteristic of the signal converter 4 is k, the digital signal corresponding to the first induced voltage signal $S_{out1}$ is k·cos θ, and the digital signal corresponding to the second induced voltage signal $S_{out2}$ is k·sin θ.

For input and output signals of the signal converter 4, a sine wave in a range of 180° is generated with respect to a rotational range of 90° of the rotator 11 having the four protruded polarities P1, P2, P3 and P4. Typically, a rotational range of the rotator 11 is referred to as a mechanical angle, and an output rotational range of the signal converter 4 is referred to as an electrical angle. That is, for the rotator 11 having the four protruded polarities P1, P2, P3 and P4, the electrical angle is double the mechanical angle. Hereinafter, only the rotational range of the rotator 11, which is referred to as a mechanical angle, is described.

Figure 5:
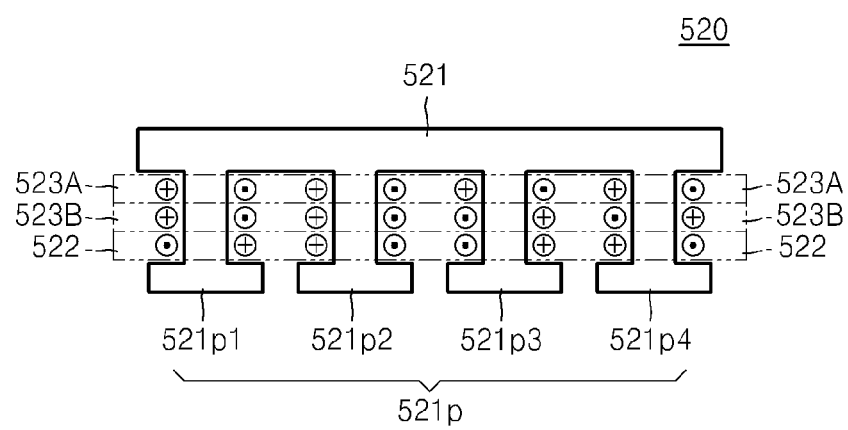
FIG. 5 is a cross-sectional view for describing a method of winding coils around a core of a stator in a method of manufacturing a resolver of the related art.

FIG. 5 is a cross-sectional view for describing a method of winding a signal source coil 522, a first output signal coil 523A, and a second output signal coil 523B around a core 521 of a stator 520 in a method of manufacturing a resolver of the related art. In FIG. 5, the mark '+' indicates a backward winding direction when each of the coils 522, 523A, and 523B is wound around the core 521, and the mark '·' indicates a forward winding direction when each of the coils 522, 523A, and 523B is wound around the protrusions 521p. In addition, reference numerals 521p1 to 521p4 indicate some of protrusions.

Referring to FIG. 5, in the resolver of the related art, the plurality of coils 522, 523A, and 523B are wound all together around each of the protrusions 521p1 through 521p4 of the core 521 of the stator 520.

Thus, as shown in Table 1 below, in the stator of the resolver of the related art, the first and second output signal coils 523A and 523B must be wound around each of the protrusions by different numbers of turns to obtain induced voltage signals of different phases. Accordingly, the total numbers of turns around the protrusions 521p of the core 521 are different from one another.

Table 1 shows the number of turns of coils wound around each of the protrusions (e.g., 521p1 through 521p4 of the core 521 of the stator 520 in the resolver of the related art. In Table 1, the sign '−' indicates a winding direction opposite to others. In Table 1, a negative number indicates a forward winding direction when each of the coils 522, 523A, and 523B is wound around the protrusions 521p, while a positive number indicates a backward winding direction when each of the coils 522, 523A, and 523B is wound around the protrusions 521p.

TABLE 1

| Protrusion No. | The number of turns of a signal source coil (522) | The number of turns of a first output signal coil (523A) | The number of turns of a second output signal coil (523B) | The total number of turns |
|---|---|---|---|---|
| 1 | 24 | 10 | 62 | 96 |
| 2 | −24 | 45 | 45 | 114 |
| 3 | 24 | 62 | 10 | 96 |
| 4 | −24 | 56 | −28 | 108 |
| 5 | 24 | 28 | −56 | 108 |
| 6 | −24 | −10 | −62 | 96 |
| 7 | 24 | −45 | −45 | 114 |
| 8 | −24 | −62 | −10 | 96 |
| 9 | 24 | −56 | 28 | 108 |
| 10 | −24 | −28 | 56 | 108 |
| ... | ... | ... | ... | ... |

Thus, the resolver of the related art has the following problems.

First, an error in the number of turns of the output signal coils 523A and 523B occurs frequently when the resolver of the related art is manufactured.

Second, since the core 521 of the stator 520 must be designed according to a protrusion having the greatest number of turns (in the case of Table 1, the second or seventh protrusion), an efficient stator structure cannot be designed.

FIG. 6 is a cross-sectional view for describing a method of winding signal source coils 122, a first output signal coil 123A, and a second output signal coil 123B around the protrusions 121p of the stator 120 in the method of manufacturing the resolver 1 of FIG. 1 according to an exemplary embodiment. In FIG. 6, the mark '+' indicates a backward winding direction when each of the coils 122, 123A, and 123B is wound around the protrusions 121p, and the mark '·' indicates a forward winding direction when each of the coils 122, 123A, and 123B is wound around the protrusions 121p. In addition, reference numerals 121p1 to 121p4 indicate some of the protrusions 121p.

Referring to FIGS. 1, 2, 3A, 3B, and 6, in the method of manufacturing the resolver 1 according to the current exemplary embodiment, the first and second output signal coils 123A and 123B are sequentially and alternately wound around different protrusions 121p of the core 121. The first output signal coil 123A is wound around even-numbered protrusions 121p2 and 121p4 of the protrusions of the core 121 (See FIG. 6). The second output signal coil 123B is wound around odd-numbered protrusions 121p1 and 121p3 of the protrusions of the core 121 (See FIG. 6).

Thus, as shown in Table 2 below, the first output signal coil 123A may be wound around the even-numbered protrusions 121p2 and 121p4 of the core 121 by the same number of turns, and the second output signal coil 123B may be wound around the odd-numbered protrusions 121p1 and 121p3 of the core 121 by the same number of turns (See FIG. 6). Accordingly, the total number of turns around each of the protrusions 121p of the core 121 is the same.

That is, even though the first and second output signal coils 123A and 123B are sequentially and alternately wound around the different protrusions 121p of the core 121 by the same number of turns, the first and second induced voltage signal $S_{out1}$ and $S_{out2}$ of different phases may be obtained due to the reluctance of the circumferential surface of the rotator 11 in the rotation direction of the rotator 11. Accordingly, the total number of turns around each of the protrusions 121p of the core 121 is the same.

Table 2 shows the number of turns of coils wound around each of the protrusions 121p of the core 121 of the stator 120 in the method of manufacturing the resolver 1 according to the current embodiment. In Table 2, the sign '−' indicates a winding direction opposite to others. In Table 2, a negative number indicates a forward winding direction when each of the coils 122, 123A, and 123B is wound around the protrusions 121p, while a positive number indicates a backward winding direction when each of the coils 122, 123A, and 123B is wound around the protrusions 121p.

TABLE 2

| Protrusion No. | Number of turns of a signal source coil (122) | Number of turns of a first output signal coil (123A) | Number of turns of a second output signal coil (123B) | Total number of turns |
|---|---|---|---|---|
| 1 and 9 | 15 | 50 | 0 | 65 |
| 2 and 10 | −15 | 0 | 50 | 65 |
| 3 and 11 | 15 | −50 | 0 | 65 |
| 4 and 12 | −15 | 0 | −50 | 65 |
| 5 and 13 | 15 | 50 | 0 | 65 |
| 6 and 14 | −15 | 0 | 50 | 65 |
| 7 and 15 | 15 | −50 | 0 | 65 |
| 8 and 16 | −15 | 0 | −50 | 65 |

Thus, the resolver and the method of manufacturing the same according to the current exemplary embodiment have the following effects.

First, occurrence of an error in the number of turns of the first and second output signal coils 123A and 123B when the resolver 1 is manufactured can be prevented.

Second, since the core 121 of the stator 120 can be designed under the condition that the total number of turns of each of the protrusions (e.g., 121p1 to 121p4) is the same, an efficient stator structure can be designed.

Figure 7:
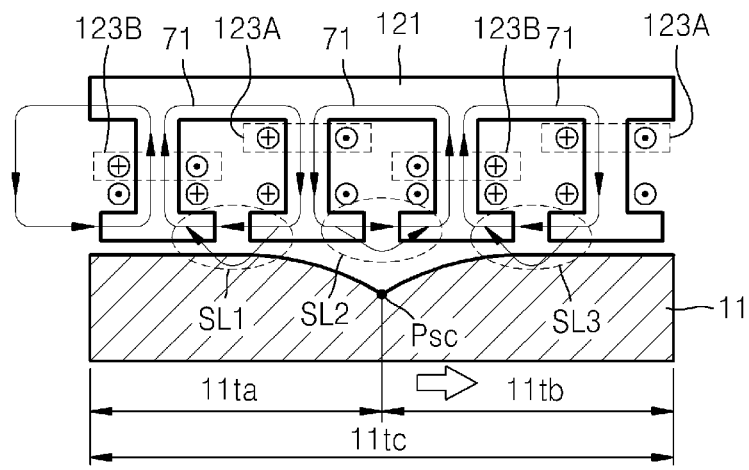
FIG. 7 is a cross-sectional view illustrating a magnetic flux variation in each slot of the stator according to a position of the rotator in the resolver of FIG. 1 according to an exemplary embodiment.

FIG. 7 is a cross-sectional view illustrating that a magnetic flux variation in each slot SL1, SL2 and SL3 of the stator 120 varies according to a position of the rotator 11 in the resolver 1 of FIG. 1.

In FIG. 7, SL1, SL2 and SL3 denote first, second and third slots formed on the core 121 of the stator 120, Psc denotes a curvature point of the rotator 11, 11*ta* and 11*tb* denote a ⅛ rotational distance of the rotator 11, and 11*tc* denotes a ¼ rotational distance of the rotator 11. In FIG. 7, the same reference numerals as in FIGS. 1, 2 3A and 3B denote the same functional objects.

A voltage e induced to the first and second output signal coils 123A and 123B is generated to suppress a change in linkage magnetic flux. That is, according to the Lorentz's law shown in Equation (6), the voltage e induced to the first and second output signal coils 123A and 123B is proportional to a direction for suppressing a change in linkage magnetic flux φ and a change rate of the linkage magnetic flux φ.

$$e = -\frac{d\Phi}{dt} \qquad \text{Equation (6)}$$

Thus, according to the state in FIG. 7, in the first and third slots SL1 and SL3, since the reluctance is small due to the closeness of the rotator 11 from the stator 120, a change rate of the linkage magnetic flux φ is large. However, in the second slot SL2, since the reluctance is large due to the farness of the rotator 11 from the stator 120, a change rate of the linkage magnetic flux φ is small.

According to the above-described operational principle, even though the first and second output signal coils 123A and 123B are sequentially and alternately wound around the different protrusions 121*p* of the core 121 with the same number of turns, the first and second induced voltage signal $S_{out1}$ and $S_{out2}$ of different phases may be obtained due to the reluctance of the circumferential surface of the rotator 11 in the rotation direction of the rotator 11. Accordingly, the total number of turns around each of the protrusions 121*p* of the core 121 can be the same. In the current exemplary embodiment, a phase difference of 90° occurs between the first induced voltage signal $S_{out1}$ and the second induced voltage signal $S_{out2}$. The description related to this is shown below with reference to FIGS. 8A through 8F and FIG. 9.

FIGS. 8A to 8F are cross-sectional views showing a case where the rotator 11 of the resolver 1 of FIG. 1 rotates from 0° to 45°. FIG. 9 is a waveform diagram of the first and second induced voltage signals $S_{out1}$ and $S_{out2}$ generated by the first and second output signal coils 123A and 123B while the rotator 11 of the resolver 1 of FIG. 1 rotates from 0° to 45°.

Figure 8A:
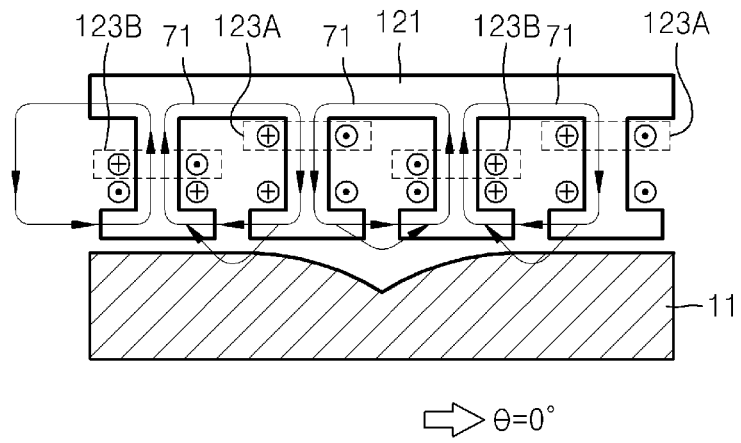
FIGS. 8A to 8F are cross-sectional views illustrating the rotator of the resolver of FIG. 1 rotating from 0° to 45° in an increment of 9°.
Figure 9:
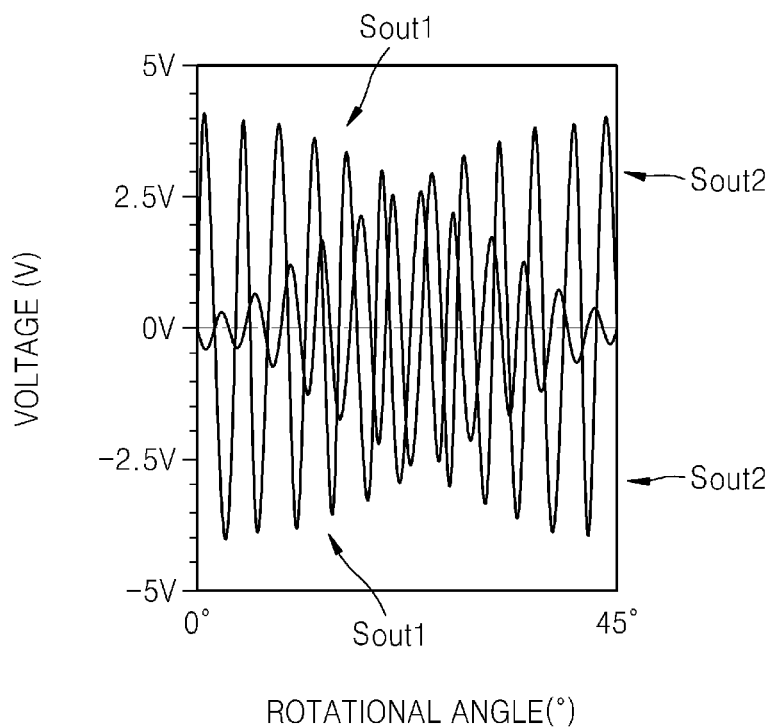
FIG. 9 is a waveform diagram of induced voltage signals generated by output signal coils while the rotator of the resolver of FIG. 1 rotates from 0° to 45°.

Referring to FIGS. 8A and 9, since a mean change rate of a linkage magnetic flux applied to the first output signal coil 123A is the highest when a rotational angle of the rotator 11 is 0°, a peak voltage value of the first induced voltage signal $S_{out1}$ is the highest. On the contrary, since a mean change rate of a linkage magnetic flux applied to the second output signal coil 123B is the lowest when the rotational angle of the rotator 11 is 0°, a peak voltage value of the second induced voltage signal $S_{out2}$ is the lowest.

Figure 8B:
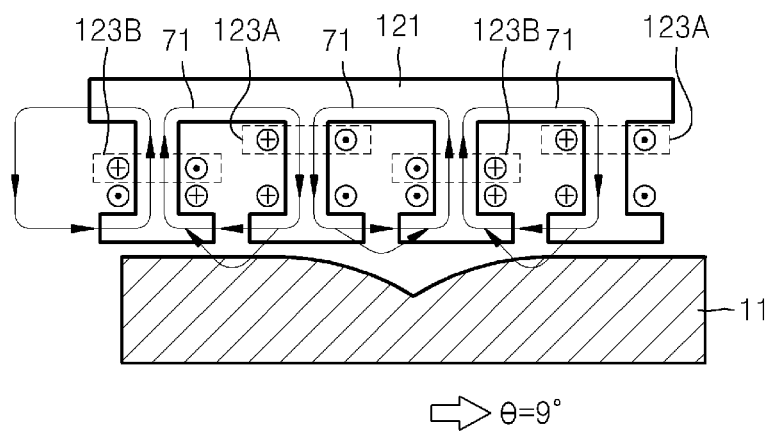

Referring to FIGS. 8B and 9, when a rotational angle of the rotator 11 is 9°, a mean change rate of a linkage magnetic flux applied to the first output signal coil 123A is lower than when the rotational angle of the rotator 11 is 0°. Thus, when the rotational angle of the rotator 11 is 9°, a peak voltage value of the first induced voltage signal $S_{out1}$ of the first output signal coil 123A is lower than when the rotational angle of the rotator 11 is 0°.

On the contrary, when the rotational angle of the rotator 11 is 9°, a mean change rate of a linkage magnetic flux applied to the second output signal coil 123B is higher than when the rotational angle of the rotator 11 is 0°. Thus, when the rotational angle of the rotator 11 is 9°, a peak voltage value of the second induced voltage signal $S_{out2}$ of the second output signal coil 123B is higher than when the rotational angle of the rotator 11 is 0°.

Figure 8C:
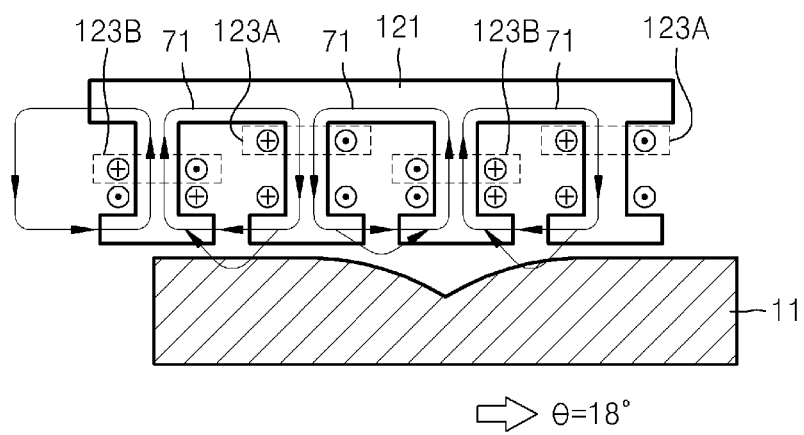

Referring to FIGS. 8C and 9, when a rotational angle of the rotator 11 is 18°, a mean change rate of a linkage magnetic flux applied to the first output signal coil 123A is lower than when the rotational angle of the rotator 11 is 9°. Thus, when the rotational angle of the rotator 11 is 18°, a peak voltage value of the first induced voltage signal $S_{out1}$ of the first output signal coil 123A is lower than when the rotational angle of the rotator 11 is 9°.

On the contrary, when the rotational angle of the rotator 11 is 18°, a mean change rate of a linkage magnetic flux applied to the second output signal coil 123B is higher than when the rotational angle of the rotator 11 is 9°. Thus, when the rotational angle of the rotator 11 is 18°, a peak voltage value of the second induced voltage signal $S_{out2}$ of the second output signal coil 123B is higher than when the rotational angle of the rotator 11 is 9°.

Figure 8D:
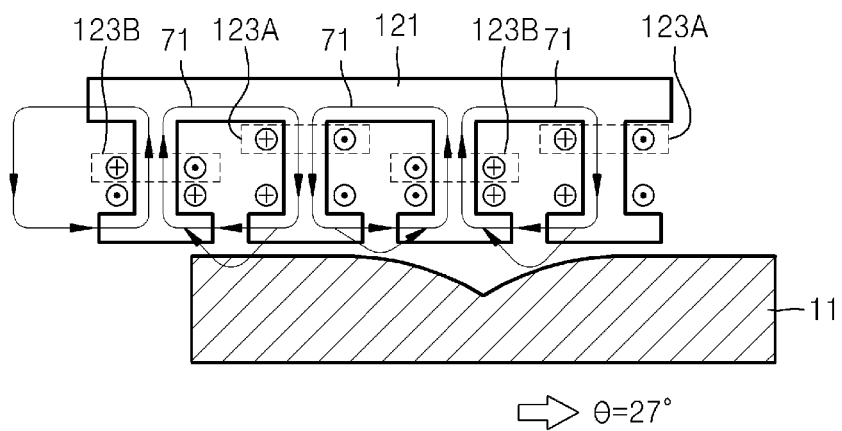

Referring to FIGS. 8D and 9, when a rotational angle of the rotator 11 is 27°, a mean change rate of a linkage magnetic flux applied to the first output signal coil 123A is lower than when the rotational angle of the rotator 11 is 18°. Thus, when the rotational angle of the rotator 11 is 27°, a peak voltage value of the first induced voltage signal $S_{out1}$ of the first output signal coil 123A is lower than when the rotational angle of the rotator 11 is 18°.

On the contrary, when the rotational angle of the rotator 11 is 27°, a mean change rate of a linkage magnetic flux applied to the second output signal coil 123B is higher than when the rotational angle of the rotator 11 is 18°. Thus, when the rotational angle of the rotator 11 is 27°, a peak voltage value of the second induced voltage signal $S_{out2}$ of the second output signal coil 123B is higher than when the rotational angle of the rotator 11 is 18°.

Figure 8E:
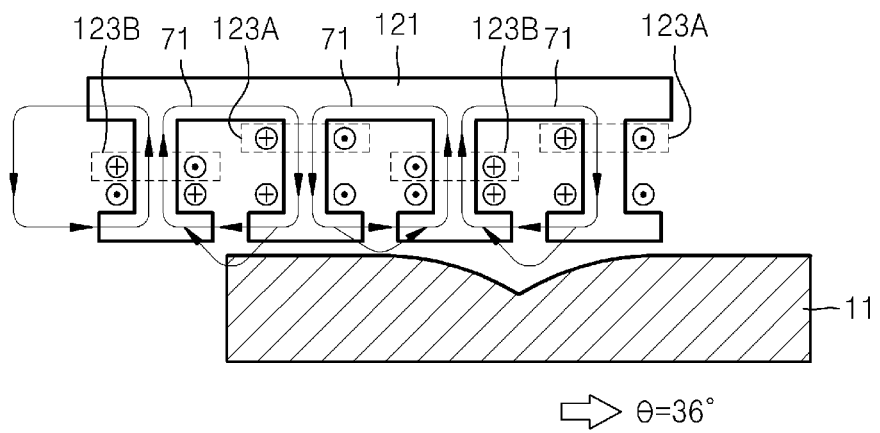

Referring to FIGS. 8E and 9, when a rotational angle of the rotator 11 is 36°, a mean change rate of a linkage magnetic flux applied to the first output signal coil 123A is lower than when the rotational angle of the rotator 11 is 27°. Thus, when the rotational angle of the rotator 11 is 36°, a peak voltage value of the first induced voltage signal $S_{out1}$ of the first output signal coil 123A is lower than when the rotational angle of the rotator 11 is 27°.

On the contrary, when the rotational angle of the rotator 11 is 36°, a mean change rate of a linkage magnetic flux applied to the second output signal coil 123B is higher than when the rotational angle of the rotator 11 is 27°. Thus, when the rotational angle of the rotator 11 is 36°, a peak voltage value of the second induced voltage signal $S_{out2}$ of the second output signal coil 123B is higher than when the rotational angle of the rotator 11 is 27°.

Figure 8F:
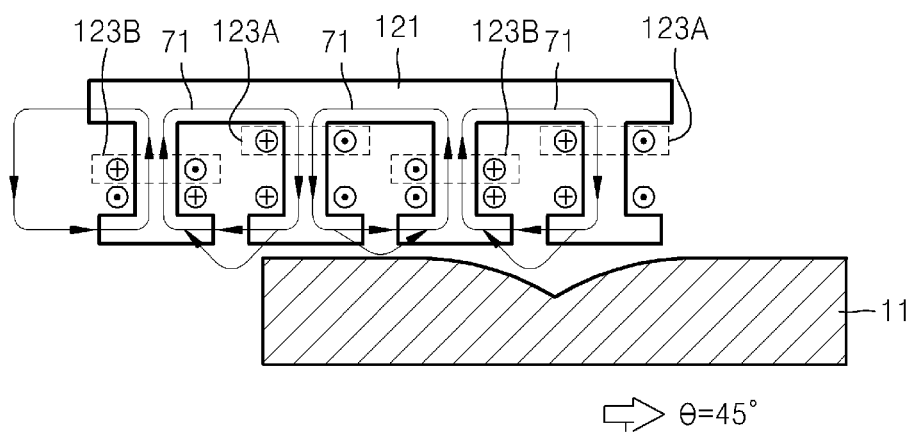

Finally, referring to FIGS. 8F and 9, when a rotational angle of the rotator 11 is 45°, a mean change rate of linkage magnetic flux applied to the first output signal coil 123A is lower than when the rotational angle of the rotator 11 is 36°. Thus, when the rotational angle of the rotator 11 is 45°, a peak voltage value of the first induced voltage signal $S_{out1}$ of the first output signal coil 123A is the lowest.

On the contrary, when the rotational angle of the rotator 11 is 45°, a mean change rate of a linkage magnetic flux applied to the second output signal coil 123B is higher than when the rotational angle of the rotator 11 is 36°. Thus, when the rotational angle of the rotator 11 is 45°, a peak voltage value of the second induced voltage signal $S_{out2}$ of the second output signal coil 123B is the highest.

Figure 10:
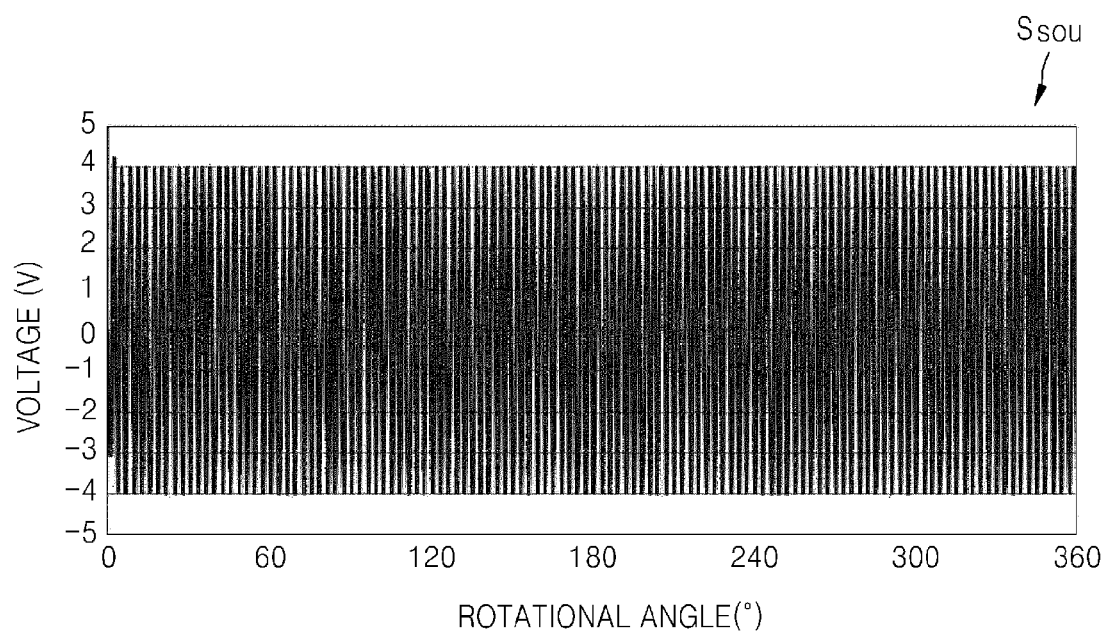
FIG. 10 is a waveform diagram of a voltage signal input to a signal source coil for simulation of a resolver operation according to an exemplary embodiment.

FIG. 10 is a waveform diagram of a voltage signal $S_{sou}$ to be input to a signal source coil for simulation of a resolver operation.

Figure 11:
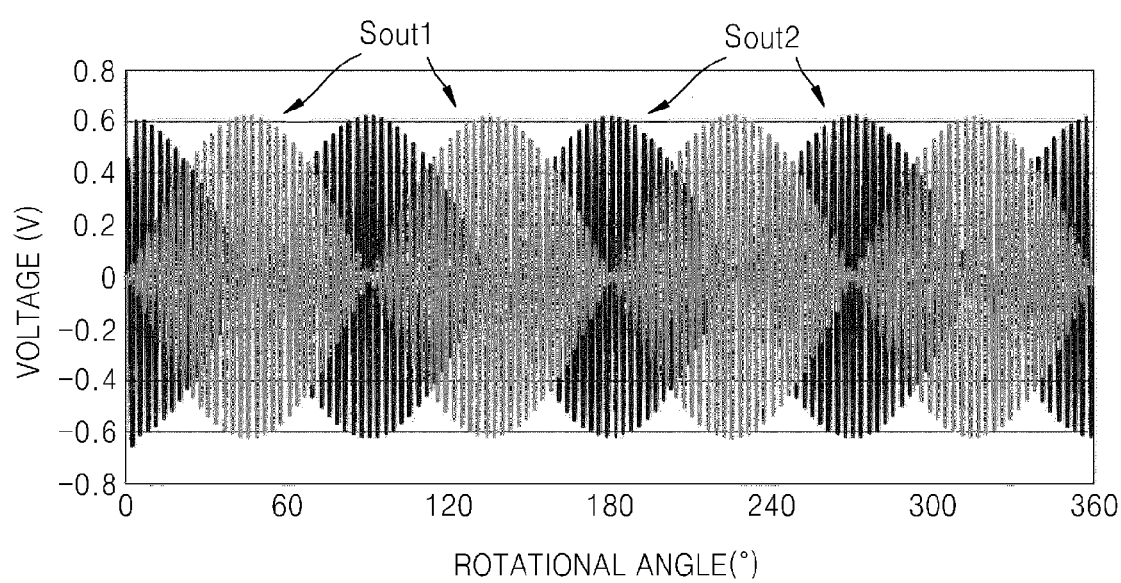
FIG. 11 is a waveform diagram of induced voltage signals generated by output signal coils when the input voltage signal of FIG. 10 is input to a signal source coil of a resolver of the related art.

FIG. 11 is a waveform diagram of the first and second induced voltage signals $S_{out1}$ and $S_{out2}$ generated by the first and second output signal coils (523A and 523B of FIG. 5) when the input voltage signal $S_{sou}$ of FIG. 10 is input to the signal source coil (522 of FIG. 5) of the resolver of the related art.

Figure 12:
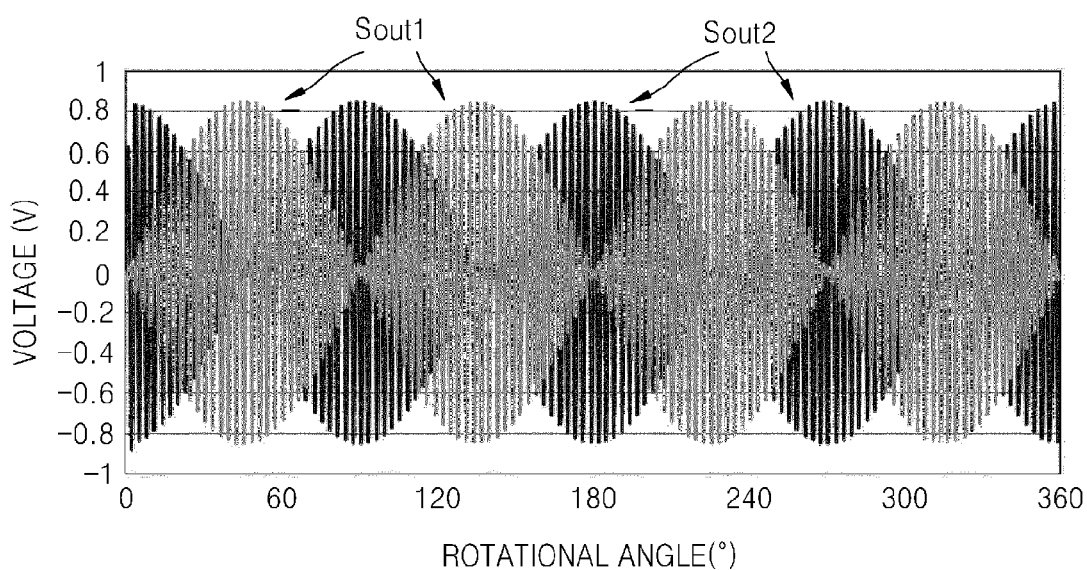
FIG. 12 is a waveform diagram of induced voltage signals generated by the output signal coils when the input voltage signal of FIG. 10 is input to the signal source coil of the resolver of FIG. 1 according to an exemplary embodiment.

FIG. 12 is a waveform diagram of the first and second induced voltage signals $S_{out1}$ and $S_{out2}$ generated by the first and second output signal coils (123A and 123B of FIG. 6) when the input voltage signal $S_{sou}$ of FIG. 10 is input to the signal source coil (122 of FIGS. 3A, 3B and 6) the resolver 1 of FIG. 1.

Referring to FIGS. 10 through 12, when the same input voltage signal $S_{sou}$ as shown in FIG. 10 is input to the signal source coil (522 of FIG. 5) of the resolver of the related art and the signal source coil (122 of FIGS. 2 and 6) the resolver 1 of the current exemplary embodiment, the first and second induced voltage signals $S_{out1}$ and $S_{out2}$ of the resolver of the related art have a phase difference of 90° therebetween as shown in FIG. 11, and the first and second induced voltage signals $S_{out1}$ and $S_{out2}$ of the resolver 1 of the current exemplary embodiment also have a phase difference of 90° therebetween as shown in FIG. 12.

Figure 13:
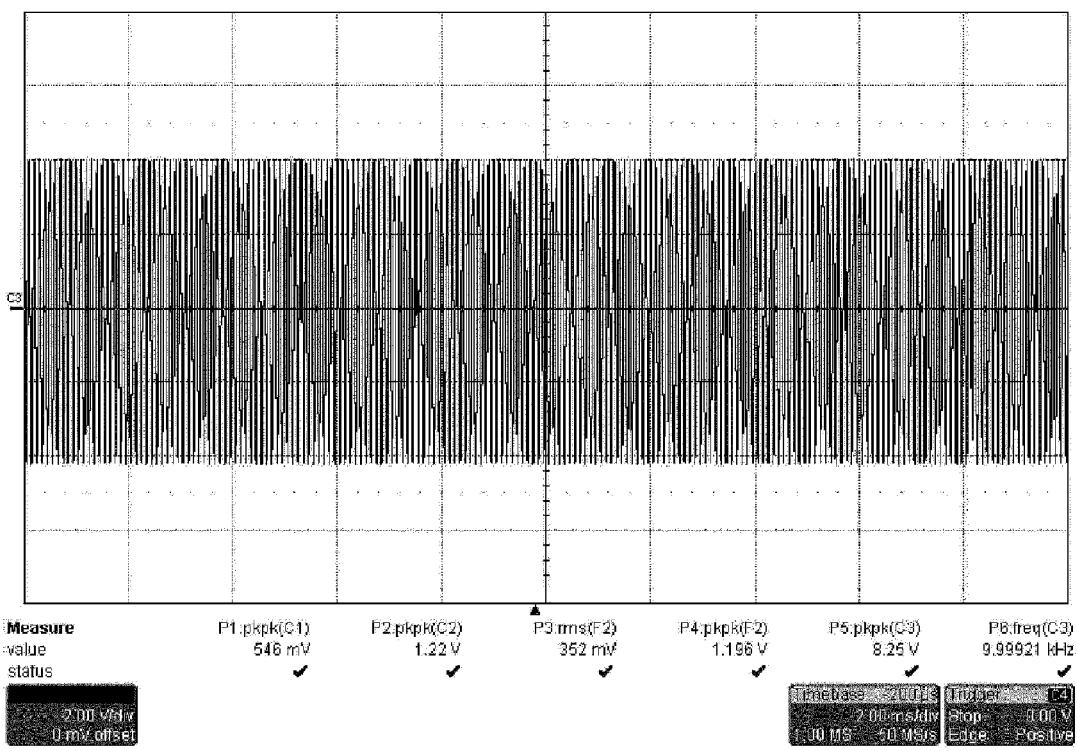
FIG. 13 is a waveform diagram of a voltage signal input to the signal source coil of the resolver of FIG. 1, the voltage signal being measured by using a waveform measuring instrument.

FIG. 13 is a waveform diagram of a result of measuring the voltage signal input to the signal source coil (122 of FIGS. 3A, 3B and 6) of the resolver 1 of FIG. 1 using a waveform measuring instrument.

Figure 14:
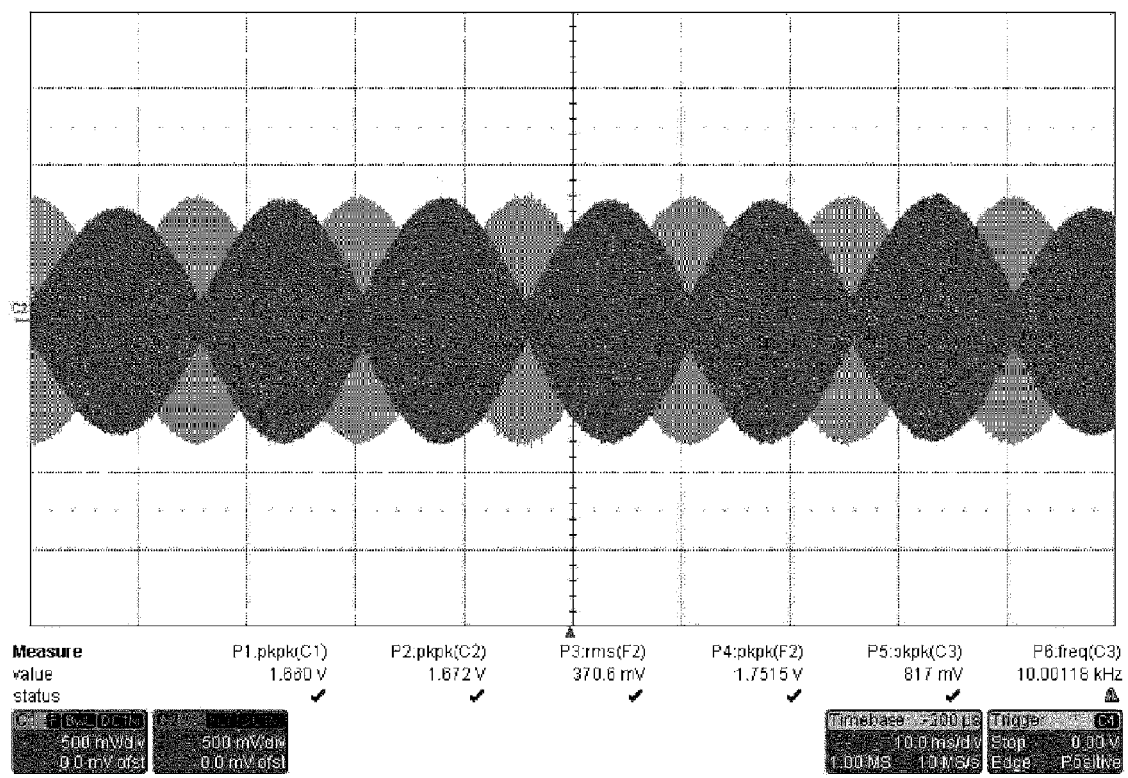
FIG. 14 is a waveform diagram of induced voltage signals generated by the output signal coils when the input voltage signal of FIG. 13 is input to the signal source coil of the resolver of FIG. 1 according to an exemplary embodiment.

FIG. 14 is a waveform diagram of induced voltage signals measured by a waveform measuring instrument, where the induced voltage signals are generated by the first and second output signal coils (123A and 123B of FIG. 6) when the input voltage signal of FIG. 13 is input to the signal source coil (122 of FIGS. 3 and 6) of the resolver 1 of FIG. 1.

Referring to FIGS. 10 through 14, the first and second induced voltage signals $S_{out1}$ and $S_{out2}$ of the resolver 1 of the current exemplary embodiment may have a phase difference of 90° therebetween.

According to a resolver and a method of manufacturing the same according to exemplary embodiments, a plurality of output signal coils are sequentially and alternately wound around different protrusions of a core.

Accordingly, even though each of the plurality of output signal coils is wound around each protrusion by the same number of turns, induced voltage signals of different phases may be obtained in response to the rotation of a rotator. Thus, the total number of turns around each protrusion of the core may be the same. According to the exemplary embodiments, each of the plurality of output signal coils may be wound around each protrusion by the same number of turns, and therefore, the total number of turns for each protrusion of the core may be the same.

According to the resolver and the manufacturing method thereof according to the exemplary embodiments, the following effects are obtained.

First, an error in the number of turns of output signal coils when resolvers are manufactured can be prevented.

Second, since a core of a stator can be designed under the condition that the total number of turns for each protrusion is the same, an efficient stator structure can be designed.

While exemplary embodiments have been particularly shown and described above, it will be understood by one of ordinary skill in the art that various changes in form and details may be made therein without departing from the spirit and scope of the inventive concept as defined by the following claims.

The exemplary embodiments should be considered in descriptive sense only and not for purposes of limitation. Therefore, the scope of the inventive concept is defined not by the detailed description of the present invention but by the claims, and all differences within the scope will be construed as being included in the exemplary embodiments.

What is claimed is:

1. A resolver configured to detect a rotational angle of a motor comprising:
   a rotator;
   a stator mounted around the rotator and comprising a core having protrusions disposed at a predetermined interval along a rotational direction of the rotator;
   a signal source coil wound around the protrusions of the core and configured to generate an alternate current (AC) magnetic field when an input voltage signal is applied thereto; and
   a plurality of output signal coils wound around protrusions of the protrusions of the core in an alternating manner along the rotational direction of the rotator,
   wherein the plurality of output signal coils comprise the same number of turns around the protrusions,
   wherein the same number of turns is obtained by the equation Nip=2 Nt/Z,
   where Nip denotes the same number of turns of the each of the plurality of output signal coils, Nt denotes a total number of turns of the output signal coil and Z denotes a number of protrusions of the core,
   wherein the plurality of output signal coils comprise:
      a first output signal coil wound around odd-numbered protrusions along the rotational direction of the rotator; and
      a second output signal coil wound around even-numbered protrusions along the rotational direction of the rotator, and
   wherein the first output signal coil wound around odd-numbered protrusions at a first position along a radial direction of the plurality of the protrusions, and the second output signal coil wound around even-numbered protrusions at a second position different from the first position along the radial direction of the plurality of the protrusions.

2. The resolver of claim 1, wherein the rotator of the resolver is configured to rotate with respect to a rotator axis of the motor and rotate with a rotator of the motor.

3. The resolver of claim 1, wherein the rotator of the resolver comprises repetitive curvatures on the circumferential surface in the rotational direction of the rotator.

4. The resolver of claim 3, wherein the rotator further comprises a plurality of protruded polarities oriented towards the protrusions of the core along the repetitive curvatures.

5. The resolver of claim 1, wherein the first output signal coil is configured to generate a first induced voltage signal in response to the AC magnetic field generated by the signal source coil and a rotation of the rotator,
   the second output signal coil is configured to generate a second induced voltage signal in response to the AC magnetic field generated by the signal source coil and the rotation of the rotator, and
   the first output signal coil and the second output signal coil provide a phase difference of 90° between the first induced voltage signal and the second induced voltage signal.

6. The resolver of claim 1, wherein the signal source coil is wound around each of the protrusions of the core by the same number of turns, and
   wherein a total number of turns for each of the protrusions of the core is the same.

7. The resolver of claim 1, wherein a number of protrusions of the core is proportional to a value obtained by multiplying a number of the output signal coils by a number of protruded polarities of the rotator.

* * * * *